(12) United States Patent
Marlett et al.

(10) Patent No.: US 6,485,114 B2
(45) Date of Patent: Nov. 26, 2002

(54) SENSOR ERROR DETECTION IN A DUAL SENSOR SYSTEM

(75) Inventors: Brian J. Marlett, Shelby Township, MI (US); Tim E. Green, Holly, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/840,708

(22) Filed: Apr. 23, 2001

(65) Prior Publication Data

US 2002/0024254 A1 Feb. 28, 2002

Related U.S. Application Data

(60) Provisional application No. 60/227,415, filed on Aug. 23, 2000.

(51) Int. Cl.[7] ................................................. B60T 8/66
(52) U.S. Cl. .......................................... 303/168; 701/34
(58) Field of Search ....................... 303/122.08, 122.04, 303/122.05, 122.07, 168, 169, 173; 340/425.5, 441, 453, 463; 73/121; 701/34, 76

(56) References Cited

U.S. PATENT DOCUMENTS 5,717,376 A  2/1998  Wilson

FOREIGN PATENT DOCUMENTS

DE    3441 103 A1    5/1986
DE    199 53 865 A1  5/2000

OTHER PUBLICATIONS

Anonymous: "Two Phase Capstan Tachometer Check", Feb., 1976. IBM Technical Disclosure Bulletin, vol. 18, No. 9, Feb. 1, 1976.

Translation of identified portions of DE 3441103.

Primary Examiner—Jack Lavinder
Assistant Examiner—C. T. Bartz

(57) ABSTRACT

A method and system for determining the operating integrity of a dual sensor system takes in signals from each of the sensors in the dual sensor system. The signals are preferably generally on the same cycle, and the control evaluates whether a single sensor has sent two consecutive cycle signals to the control without a corresponding cycle from the other of the sensors. If so, an indication is made that the other of the sensors may be failing, or is intermittent. Preferably the sensors are associated with wheel speed indicators and the control is an ABS control.

10 Claims, 1 Drawing Sheet

SENSOR ERROR DETECTION IN A DUAL SENSOR SYSTEM

This application claims priority to provisional application Ser. No. 60/227,415, filed Aug. 23, 2000.

BACKGROUND OF THE INVENTION

This application relates to a method of easily testing the sensors in a dual sensor system to determine whether the sensors have failed, or are failing (i.e., only operating intermittently).

Modern vehicles are being provided with more systems which require sensor inputs. As an example, antilock brake systems utilize wheel speed sensor information from sensors associated with each of the wheels. The sensor information is often utilized to make critical decisions, such as whether and how much to actuate a brake. If the sensor information is inaccurate, this is of course, undesirable. If the sensors are not providing accurate information, it is important that the failure of a particular sensor be quickly identified. In the past, there have been no practical or simple methods for identifying a failing sensor in a two-sensor system.

Sensors can fail for a variety of reasons, and in a variety of ways. As an example, a sensor can become damaged such that is fails completely, or can become intermittent. This can occur due to damage, or manufacturing problems such as a bad solder joint. Further, environmental conditions can also cause a sensor to fail or become intermittent.

SUMMARY OF THE INVENTION

In this invention, a pair of sensors has their signals evaluated in a fashion to identify whether one of the sensors is failing or becoming intermittent. Typically, the sensors are of the sort which provides unitary signals in a cyclic fashion. There is preferably a phase angle difference between the two sensor signals. If a signal is sensed from a first sensor, and a second sensor which should be expected to provide a signal on the same cycle as the first signal, does not send a signal before the first sensor has a subsequent signal sent, the control identifies a problem. The signal can be sensed most preferably at the transition of either a rising or falling signal. If the sensors are operating correctly, then the sensor signals will be on relatively the same cycle, but spaced by some phase difference.

The present invention monitors transitions of the signals and maintains a memory of the last signal to transition. The system can then identify when one of the sensors has failed, or is becoming intermittent. Preferably, a counter associated without the control counts the number of signals from one of the sensors with a corresponding signal from the other. A preset number of signals can be set for determination that the other sensor has failed completely.

This system also incorporates a control that zeros the counter if there is a change in direction, as would otherwise potentially result in a signal being received from one of the sensors which had last sent a signal prior to the other sensor sending a signal. That is, for the wheel sensor, when the vehicle begins moving in a different direction (i.e., reverse to forward), it would be expected to receive two subsequent signals from one signal.

These and other features of the present invention can be best understood from the following specification and drawings, the following of which is a brief description.

DETAILED DESCRIPTION OF A PREFERRED EMBODIMENT

Figure 1:
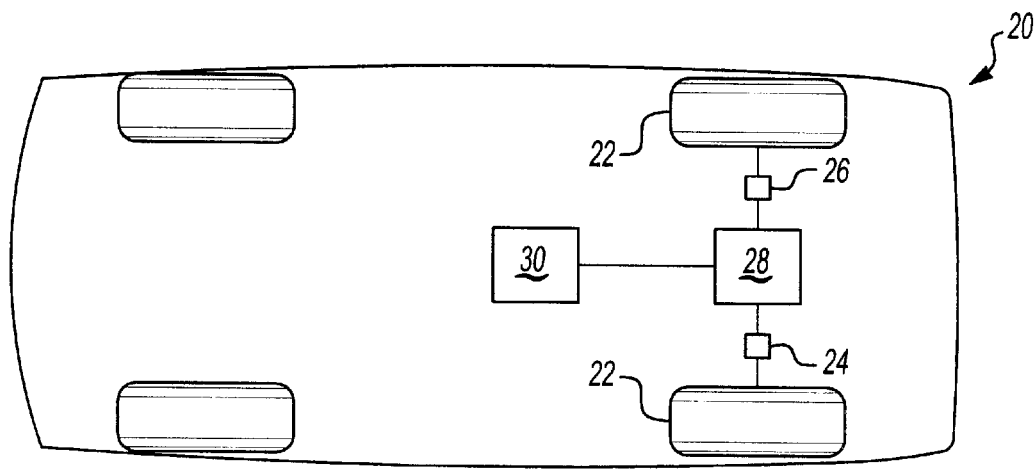
FIG. 1 is a schematic view of the vehicle incorporated in the present invention.

A vehicle 20 is shown schematically in FIG. 1 having a pair of wheels 22. A first sensor 24 and a second sensor 26 are shown associated with the two wheels.

A control 28 receives signals from the sensors 24 and 26 and utilizes those signals to make a decision. In one preferred embodiment control 28 is an ABS braking control, and the sensors 24 and 26 are Hall Effect sensors for providing wheel speed or rotation information to the control 28. The control 28 utilizes this information to make decisions on how to control the ABS system.

A display 30 is shown within the vehicle 20 and is operable to send some signal indicative of a sensor failing should control 28 determine that one of sensors 24 and 26 is failing. While the control 28 is shown as providing both the diagnostic evaluation of the sensors 24 and 26 and is schematically described as being the ABS controller, it should also be understood that separate controllers can be utilized. Further, while this system is disclosed as an ABS control system, with the sensors 24 and 26 being part of the ABS control, it should be understood that other dual sensor systems will also benefit from this invention.

Figure 2:
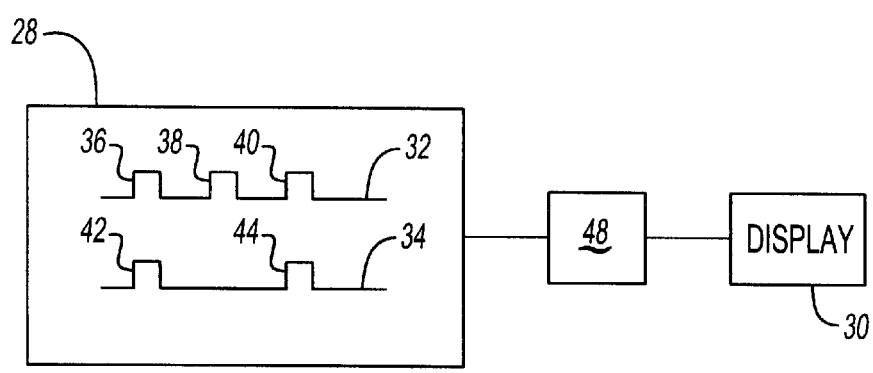
FIG. 2 is a schematic view of a control according to the present invention.

As shown in FIG. 2, control 28 receives a first signal 32 from sensor 24 and a second signal 34 from sensor 26. As shown, the signals each consist of a plurality of cyclic signals spaced by a period of time. Thus, three consecutive signal cycles 36, 38 and 40 are shown for signal 32. To describe the occurrence of an intermittent failure, the signal 34 is shown in FIG. 2 having a first cycle 42, and a second cycle 44 spaced from the cycle 42. Essentially, there has been an intermittent missing cycle between the cycles 42 and 44. The control 28 evaluates the signals such as by looking at either the rising or falling portion of the signals. Thus, a rising portion of the signal 36 is stored in a memory/counter 48. Now, when the signal 42 has its rising portion, the memory/counter 48 stores that the second signal 34 has been the most recent reporting signal. When the rising portion of the signal 38 is received, it is the signal 32 which is again stored in the counter 48. However, as shown, the signal cycle from the signal 34 has missed its signal associated with the signal 38. This can occur such as when the sensor 26 is failing, and becoming intermittent. Thus, the signal 40 has its rising signal occurring before the signal 44. When the counter 48 receives two consecutive cycles from the signal 32, an indication is made to the display 30 that the signal 26 is at least becoming intermittent, and may be failing. The signal 30 could be stored in a memory, or can be displayed to an operator, as desired.

The counter 48 also preferably counts consecutive cycles from one of the signals without a corresponding cycle from the other signal. Some predetermined number can be associated with the counter 48 at which time a determination is made that one of the sensors has completely failed. As an example, should the counter 48 receive five consecutive signal cycles from the signal 32, a determination may be made that the sensor 26 has failed completely. This can be displayed/stored in a different way at the display 30.

The present invention thus provides a method of easily testing the operating condition of a pair of sensors which are operating roughly on the same cycle. Although a preferred embodiment of this invention has been disclosed, a worker in this art would recognize that certain modifications would come within the scope of this invention. For that reason the following claims should be studied to determine the true scope and content of this invention.

What is claimed is:

1. A method of testing a pair of sensors providing signals on an approximately equal cycle comprising the steps of:
   1) providing a pair of sensors each sending cyclic signals to a control;
   2) receiving a signal from one of said sensors, and storing an indication of said one of said sensors being the last sensor to send a signal, and changing the stored indication when a signal is received from the other of said sensors;
   3) providing a first level of warning that one of said sensors has a problem should said control identify a signal cycle from one of said sensors without a corresponding signal cycle from the other of said sensors for a predetermined number of signal cycles; and
   4) said predetermined number of signals is 2, and a second higher level of warning is sent if a greater predetermined number of consecutive signal cycles from one of said sensors without a signal cycle from the other of said sensors being received.

2. A method as set forth in claim 1, wherein said predetermined number of signal cycles is greater than 2.

3. A system as recited in claim 1, wherein said sensors are vehicle wheel rotation sensors.

4. A method as set forth in claim 1, wherein said predetermined number of signal cycles is 2, and a second higher level of warning is sent if a greater predetermined number of consecutive signal cycles from one of said sensors without a signal cycle from the other of said sensors being received.

5. A method of testing a pair of sensors providing signals on an approximately equal cycle comprising the steps of:
   1) providing a pair of sensors each sending cyclic signals to a control;
   2) receiving a signal from one of said sensor, and storing an indication of said one of said sensors being the last sensor to send a signal cycle, and changing the stored indication when a signal cycle is received from the other of said sensors;
   3) providing an indication that one of said sensors has a problem should said control identify a signal cycle from one of said sensors without a corresponding signal cycle from the other of said sensors for a predetermined number of signal cycles; and
   4) the stored indication of Step (2) is reset when a vehicle associated with said sensors has its travel direction reversed.

6. A method as set forth in claim 1, wherein said signal having edges and said edges of said signal are identified to provide said receiving function of Step (2).

7. A system for providing sensor information to a control unit to make a decision comprising:
   a pair of sensors each sending signals to a control unit, said signals being cyclic and on the same cycle;
   said control unit for receiving said signals and utilizing said signals to make a determination of a control unit output, said control unit evaluating said signals to determine whether consecutive cycles of the said signal of one of said sensors are received without a corresponding signal being received from the other of said sensors, and said control unit providing an indication that one of said sensors may be failing if consecutive signals are received from one of said sensors without a corresponding signal from the other of said sensors; and
   said control unit indication being reset to zero should a vehicle associated with said system have its travel direction reversed.

8. The system as set forth in claim 7, wherein said sensors arc associated with vehicle wheels, and said control associated with an ABS braking system.

9. The system as set forth in claim 7, wherein a counter is provided as part of said control unit for counting receipt of a signal from one of said sensors, and for counting the number of consecutive signals.

10. A system as set forth in claim 7, wherein said signals having edges and said control looks for said edges of said signal.

* * * * *